(12) United States Patent
Adam et al.

(10) Patent No.: US 10,549,227 B2
(45) Date of Patent: Feb. 4, 2020

(54) FILTER UNIT FOR A FUME EXTRACTION DEVICE, AND COMBINATION APPLIANCE HAVING A COOKTOP AND A FUME EXTRACTION DEVICE HAVING A FILTER UNIT

(71) Applicant: BSH Hausgeräte GmbH, Munich (DE)

(72) Inventors: Julien Adam, Strasbourg (FR); Nicolas Chabut, Gertwiller (FR); Sebastien Flesch, Gerstheim (FR)

(73) Assignee: BSH Hausgeräte GmbH, Munich (DE)

( * ) Notice: Subject to any disclaimer, the term of this patent is extended or adjusted under 35 U.S.C. 154(b) by 163 days.

(21) Appl. No.: 15/752,598

(22) PCT Filed: Aug. 5, 2016

(86) PCT No.: PCT/EP2016/068806
§ 371 (c)(1),
(2) Date: Feb. 14, 2018

(87) PCT Pub. No.: WO2017/029138
PCT Pub. Date: Feb. 23, 2017

(65) Prior Publication Data
US 2018/0229171 A1 Aug. 16, 2018

(30) Foreign Application Priority Data
Aug. 19, 2015 (EP) .................................. 15290205

(51) Int. Cl.
*B01D 46/00* (2006.01)
*F24C 15/20* (2006.01)
(Continued)

(52) U.S. Cl.
CPC ......... *B01D 46/0031* (2013.01); *B01D 46/10* (2013.01); *F24C 15/2035* (2013.01); *F24C 15/2042* (2013.01); *F24C 15/32* (2013.01)

(58) Field of Classification Search
CPC ........... F24C 15/20; F24C 15/32; B01D 46/00
(Continued)

(56) References Cited

U.S. PATENT DOCUMENTS

| 4,446,849 A | * | 5/1984 | McFarland | ......... F24C 15/2042 |
| | | | | 126/299 R |
| 4,765,811 A | * | 8/1988 | Beckon | .............. B01D 46/2414 |
| | | | | 55/498 |

(Continued)

FOREIGN PATENT DOCUMENTS

| DE | 102005019830 A1 | 11/2006 |
| DE | 102013007722 A1 | 11/2014 |

OTHER PUBLICATIONS

International Search Report PCT/EP2016/068806 dated Oct. 3, 2016.

*Primary Examiner* — Edelmira Bosques
*Assistant Examiner* — Nikhil P Mashruwala
(74) *Attorney, Agent, or Firm* — Michael E. Tschupp; Andre Pallapies; Brandon G. Braun (57) ABSTRACT

A filter unit for a fume extraction device includes a filter body having a filter element and a collecting region which is situated below the filter body and at least partially surrounds the filter body for collecting a liquid. An upper region of the filter unit is formed with an air inlet opening to let in air that is suctioned by the fume extraction device, with the air inlet opening at least partially surrounding the filter body. A bottom side of the filter unit is provided with an air outlet opening to let air out of the filter unit to the fume extraction device.

9 Claims, 4 Drawing Sheets

(51) Int. Cl.
*B01D 46/10* (2006.01)
*F24C 15/32* (2006.01)

(58) Field of Classification Search
USPC .................................................. 126/299 D
See application file for complete search history.

(56) References Cited

U.S. PATENT DOCUMENTS

| | | | | |
|---|---|---|---|---|
| 5,001,970 | A * | 3/1991 | Graver | A47J 36/38 |
| | | | | 126/21 A |
| 5,884,619 | A * | 3/1999 | Terry | F24C 15/2042 |
| | | | | 126/299 D |
| 6,455,818 | B1 | 9/2002 | Arntz et al. | |
| 6,569,008 | B1 | 5/2003 | Chang | |
| 6,648,937 | B1 * | 11/2003 | Nguyen | B01D 45/00 |
| | | | | 126/299 R |
| 6,820,609 | B2 * | 11/2004 | Woodall, III | F24C 15/20 |
| | | | | 126/299 D |
| 7,687,748 | B2 * | 3/2010 | Gagas | H05B 6/1263 |
| | | | | 126/21 A |
| 9,222,680 | B1 * | 12/2015 | Woodall, III | F24C 15/20 |
| 10,006,641 | B2 * | 6/2018 | Bruckbauer | F24C 15/2035 |
| 10,041,687 | B1 * | 8/2018 | Caneba | F24C 15/20 |
| 2002/0083691 | A1 * | 7/2002 | Chang | B01D 46/0005 |
| | | | | 55/385.1 |
| 2006/0150965 | A1 * | 7/2006 | Kim | F24C 15/2042 |
| | | | | 126/299 D |
| 2011/0146657 | A1 * | 6/2011 | Briedis | F24C 15/2042 |
| | | | | 126/39 E |
| 2014/0048057 | A1 | 2/2014 | Bruckbauer | |
| 2018/0209662 | A1 * | 7/2018 | Adam | F24C 15/2035 |
| 2019/0162421 | A1 * | 5/2019 | Cimino | F24C 15/2042 |

* cited by examiner

FILTER UNIT FOR A FUME EXTRACTION DEVICE, AND COMBINATION APPLIANCE HAVING A COOKTOP AND A FUME EXTRACTION DEVICE HAVING A FILTER UNIT

CROSS-REFERENCES TO RELATED APPLICATIONS

This application is the U.S. National Stage of International Application No. PCT/EP2016/068806, filed Aug. 5, 2016, which designated the United States and has been published as International Publication No. WO 2017/029138 A1 and which claims the priority of European Patent Application, Serial No. 15290205.2, filed Aug. 19, 2015, pursuant to 35 U.S.C. 119(a)-(d).

BACKGROUND OF THE INVENTION

The present invention relates to a filter unit for a fume extraction device and a combination appliance having a cooktop and a fume extraction device having such a filter unit.

In kitchens, it is known to use so-called downdraft fans instead of fume extractor hoods which are arranged above a cooktop, for example on the room wall or ceiling, in order to extract fumes and vapors which are producing during cooking. Such downdraft ventilation is disclosed, for example, in DE 10 2013 007 722 A1. In this case, a cooking steam inlet opening placed in the cooktop plane is connected via an exhaust channel system to a vacuum source. The downdraft ventilation in this case is provided as a separate appliance between two cooktops or adjacent to a cooktop. In order to prevent the entry of liquids into the vacuum source, it is known to arrange a filter element in the exhaust channel system and to provide a trough below the filter element for collecting liquids and other contaminants. A drawback with this known filter arrangement is that liquid which enters the cooking steam inlet opening has to pass through the filter element before it reaches the trough.

A cooktop with central extraction of cooking fumes in the downward direction is also disclosed in WO 2012/146237 A1. In this cooktop, one or more recesses are incorporated in the region around the geometric surface center of gravity. Devices are provided below the cooktop for the extraction of cooking fumes. The devices for the extraction of cooking fumes are preferably constituted by radial fans which are fastened to the lower face of a cooktop housing and via which air is extracted upwardly out of cooking fume extraction chambers located therebelow. A fat filter insert may be introduced into the recess, the lateral walls of said fat filter insert being permeable to cooking fumes and the bottom thereof forming a collection tray. In this fat filter insert, although the collection tray is able to serve for receiving liquids, when a filling state of the collection tray which is greater than the height thereof is reached, the liquid will again penetrate into the filter material.

BRIEF SUMMARY OF THE INVENTION

It is the object of the present invention, therefore, to provide a solution by means of which a filter unit is designed both to filter contaminants and liquids from fumes and vapors and to receive or conduct greater quantities of liquid and, in particular in a combination appliance consisting of the fume extraction device and cooktop, an optimized guidance of liquid combined with effective cleaning of the fumes and vapors is ensured by the filter element.

The invention is based on the recognition that this object is able to be achieved by a filter unit being produced in which a collecting region for liquids is provided, said collecting region not being covered by the filter material of the filter element and preferably having at least one overflow which is spaced apart from the filter element.

According to a first aspect, therefore, the object is achieved by a filter unit for a fume extraction device, which filter unit comprises at least one filter body which has at least one filter element and at least one collecting region for liquids. The filter unit is characterized in that an air inlet opening is formed on the filter unit in the upper region, which air inlet opening serves to let in air that is suctioned by the fume extraction device, that an air outlet opening is provided in the bottom side of the filter unit, which air outlet opening serves to let air out of the filter unit to the fume extraction device, and that the collecting region lies below the at least one filter body and at least partially surrounds the at least one filter body.

Directional information, such as for example "above" or "below" which relate to the filter unit or parts thereof, provided nothing further is specified, refer to the filter unit in an installed state in which the filter unit is incorporated in a horizontally located opening of an appliance which comprises a fume extraction device, in particular in a horizontally located recess of a cooktop. The upper face of the filter unit, therefore, constitutes the suction side and the lower face of the filter unit constitutes the clean air side. The "upper face of the filter unit" is preferably understood as the region in which the filter unit bears against the opening of the appliance having the fume extraction device, in particular the recess of the cooktop. On the upper face of the filter unit, preferably a fastening device may be provided for fastening the filter unit to an opening of the appliance having the fume extraction device, in particular to a recess in a cooktop. The fastening device may also be denoted as a mounting device and may, for example, constitute a bent-back portion or a projection. However, it is also within the scope of the invention that the filter unit in the upper region only bears with the outer face thereof on the internal periphery against the opening of the appliance having the fume extraction device, in particular the recess of the cooktop, and the lower face of the filter unit is positioned on a component in the interior of the appliance, in particular below the cooktop.

According to the invention, the fume extraction device is denoted as a device by means of which air and, in particular, fumes and vapor produced during cooking may be extracted from a space above a cooktop. The fume extraction device has at least one blower. The blower, which may also be denoted as a fan or suction blower, preferably comprises a blower housing which is designed, for example, as a spiral housing or worm housing and may also be denoted as a fan housing. A fan wheel is received in the blower housing, said fan wheel being driven by a motor which is also received in the blower housing. The blower housing has an air inlet opening, suctioned air being able to reach the fan wheel via said air inlet opening. Moreover, the fan housing comprises an air outlet opening, air being able to be discharged radially thereby. In a blower which is constituted by a radial blower, the air inlet opening is preferably located in the region of the axis of the fan wheel.

The filter unit is preferably denoted as a fat filter unit, fats and other contaminants, in particular liquids, being able to be separated thereby from the air. To this end, the filter unit according to the invention comprises at least one filter body having at least one filter element. The filter element may consist of expanded metal layers, braided or knitted metal threads or of other filter materials. According to the present invention, one or more filter elements may be contained in the filter unit. Hereinafter, the invention is substantially described with reference to one filter element, wherein the embodiments made here—provided nothing further is specified—also apply to a plurality of filter elements.

According to the invention, the filter body of the filter unit is understood as a contour or a component which extends at least partially above the height of the filter unit and which defines an internal space at least on two sides. Preferably, the filter body is sealed at the top and open at the bottom. Therefore, the filter body may, for example, be a frame which has a V-shaped or U-shaped cross section and in which filter elements are inserted in openings in one of the two arms of the V-shape or U-shape or in both arms. Alternatively, a tubular filter body may also be used, the longitudinal axis thereof being located in the vertical direction of the filter unit and the envelope surface thereof being at least partially formed by a filter element. Moreover, it is also possible to use a filter body which has a rectangular cross section and is open at least at the bottom and in which at least one of the outer walls is formed by a filter element. The further regions of the envelope surfaces or outer surfaces are thus formed by air-impermeable material. In the case of a tubular filter body or a filter body having a rectangular cross section, preferably the upper face of the filter body is closed. This may be implemented by a region of the filter body or by a separate cover.

According to the invention, the filter unit comprises at least one collecting region for liquids. In this case, the collecting region is denoted as a contour or a part of the filter unit in which liquids are collected from the filter element(s) and/or liquids which drain into the filter element from above. The collecting region is also denoted hereinafter as the collection container. The collecting region may be designed as a separate component which may be connected to the filter body. The collecting region may also be constituted by a separate component relative to a filter holder, the filter unit being able to be held thereby on the appliance having the fume extraction device. Preferably, however, the collecting region is configured in one piece with at least one filter holder, i.e. it forms a part of the filter holder. The collecting region is also configured in one piece with the filter body, in particular in the embodiment in which the filter body has a frame or walls made of air-impermeable material the collecting region may be configured in one piece with the filter body and, in particular, the regions thereof which consist of air-impermeable material.

An air inlet opening is formed on the filter unit in the upper region, which air inlet opening serving to let in air that is suctioned by the fume extraction device. The air inlet opening in this case is preferably located in the upper face of the filter unit but may also be located slightly offset downwardly relative to the upper face in the filter unit. The suctioned air thus flows with the air from above according to the invention into the filter unit. The air inlet opening at least partially surrounds the at least one filter body. In particular, in a vertical projection of the air inlet opening on the filter body, the air inlet opening is located outside the filter body.

Additionally, an air outlet opening is provided in the bottom side of the filter unit, which air outlet opening serving to let air out of the filter unit to the fume extraction device.

According to the invention, the collecting region is located beneath the at least one filter body and at least partially surrounds the at least one filter body. The collecting region in this case is preferably arranged beneath a lower edge of the filter body. "Beneath" in this context means that the collecting region is located in the vertical direction below the lower edge of the filter body, i.e. is offset downwardly. According to the invention, the collecting region may also be located in the horizontal direction below the filter body and, in particular, a lower edge of the filter body, i.e. the vertical projection of the lower edge of the filter body on the collecting region may be preferably located within the surface of the collecting region. By this arrangement of the collecting region a series of advantages may be achieved. In particular, by the arrangement of the collecting region which is located below the filter body both in the vertical and in the horizontal direction, it may be ensured that liquids which pass from the filter element(s) of the filter body, i.e. drain off the filter element, are able to reach the collecting region. Alternatively, however, it is also possible that the vertical projection of the lower edge of the filter body is located outside the collecting region, adjacent thereto.

Since the collecting region at least partially surrounds the filter body, i.e. in vertical plan view it is arranged at least partially outside the filter body or adjacent to the filter body around said filter body, and the air inlet opening is also provided outside the filter body around said filter body, the collecting region is therefore also accessible to liquids which do not originate from the filter elements of the filter body. The collecting region is preferably located at least partially below the air inlet opening. Thus liquids which drain into the filter unit via the air inlet opening of the filter unit but do not reach the filter element(s) may be collected in the collection container. Additionally, by the arrangement of the collecting region outside the filter body it is also possible to divert the liquid, which is collected in the collecting region, from the collecting region without this liquid having to pass through the filter body and, in particular, the filter element(s) of the filter body, as is the case in the prior art.

According to a preferred embodiment, the at least one filter element in the filter unit is located in a direction which is inclined relative to the horizontal. This embodiment has the advantage that, due to the alignment of the filter element, liquids which are filtered out in the filter element run toward the lower edge thereof and from there are able to reach the collecting region in a reliable manner.

Particularly preferably, the filter element(s) in the filter unit is or are located in the vertical direction. This embodiment has the advantage that the filter surface of the filter elements is located in the vertical direction and thus is not able to be reached by liquids which drain into the filter unit from above via the air inlet opening. Additionally, by this alignment, the filter surface may be maximized for a predetermined size of opening in an appliance having a fume extraction device in which the filter unit is incorporated.

According to a preferred embodiment, the filter body forms a hollow body which is open at least at the bottom. A "hollow body" is understood according to the invention as a body which consists of an outer wall which may also be denoted as an outer surface or envelope surface and which is open on at least one lower face. The hollow body may also be denoted as a tubular piece or profiled piece, wherein the cross section of the tubular piece or profiled piece, for example, may be round or polygonal, in particular quadrangular. In this case, the at least one filter element is preferably located in the vertical direction in the filter body. The filter element(s) in this case may form the entire envelope surface or outer surface of the hollow body. However, it is also within the scope of the invention that the filter element(s) form only a part of the envelope surface or outer surface of the hollow body and the further parts of the hollow body are formed by plates or the frame which consist of an air-impermeable material. Since the filter body forms a hollow body, which is at least partially formed by at least one of the filter elements which is preferably located in the vertical direction and which is open at the bottom, air may be suctioned in via the envelope surfaces or outer surfaces of the hollow body and the filter surface is thereby increased further for a predetermined size of a recess in which the filter unit is incorporated.

According to the invention, the cross section of the filter body formed as a hollow body may be round or quadrangular. The shape of the hollow body in this case is preferably selected according to the shape of the opening in the appliance having the fume extraction device and, in particular, the recess of a cooktop in which the filter unit is incorporated.

Particularly preferably, in the embodiment of the filter unit with a hollow body as the filter body which is formed at least partially by one of the filter elements, the hollow body surrounds the air outlet opening of the filter unit. As a result, the air passing through the filter elements is able to reach the air outlet opening directly.

According to one embodiment, the collecting region is constituted by a groove which at least partially surrounds the at least one filter body. In a filter body which is constituted by a hollow body with a continuous envelope surface or outer surface which is formed by one of more filter elements, the collecting region is preferably an annular groove which extends around the lower edge of the filter body, i.e. it surrounds said filter body. In a filter body which is constituted by a hollow body in which only one part of the envelope surface or outer surface of the hollow body is formed by filter elements, the groove may be provided simply in the region on the lower face of the filter body in which the filter element(s) is or are provided. In one embodiment of the filter body which is constituted by a frame bent in a V-shape, the groove may be provided, for example, merely on the lower faces of the arms of the V-shaped frame.

The advantage of the embodiment of the collecting region as a groove is that liquids are able to enter the groove over the length thereof and in contrast to a pot-shaped collecting region a further supply line for the liquids is not necessary.

According to a preferred embodiment, the filter unit comprises a filter holder for the filter body, said filter holder at least partially surrounding the filter body. In a vertical plan view of the filter holder, the filter holder is preferably located outside the filter body and/or intersects with the outer edge of the filter body. Preferably, the bottom of the filter holder constitutes the collecting region of the filter unit. The at least one filter body in this case is preferably received in the filter holder. This means that at least one part of the height of the filter body is preferably received in a space formed by the filter holder.

The "filter holder" in this case is denoted as the part of the filter unit via which the filter unit and, in particular, the filter body may be held on the opening in the appliance having the fume extraction device, in particular on the recess of a cooktop. The filter holder may also be denoted as a filter support. Particularly preferably, the filter holder has a trough shape with a bottom opening. On the upper edge of the outer walls of the trough shape, a bent-back portion or a further fastening device for fastening the filter holder to the appliance may be provided, in particular in a recess of the cooktop. Around the bottom opening, the trough-shaped filter holder comprises an internal wall which extends upwardly. Thus in the bottom of the filter holder a groove-shaped region is formed, preferably continuously around the filter body, liquids being able to be received and collected therein. At the same time, the filter body may be releasably fastened to the cooktop via the filter holder. Thus the construction of the filter unit is simplified, since the collecting region is also provided by the filter holder at the same time. The filter holder in this embodiment, therefore, may also be denoted as the collection container. Additionally, due to the function of the retention of the filter body which is generally carried out from below, the bottom of the filter holder is located at a lower level than the lower edge of the filter body. As a result, it is possible for contaminants to drain from the filter body and, in particular, from the filter element into the collecting region in a reliable manner.

According to a preferred embodiment, at least one part of the upper edge of the collecting region forms an overflow edge for the overflow of liquids. By the provision of an overflow edge, when a large quantity of liquid passes through the filter unit and collects in the collection container, it is possible to ensure that the liquid is diverted to a different overflow container in a reliable manner. Since the overflow edge is provided on the upper edge of the collecting region, however, initially the space in the collecting region may still be used for collecting liquids. The liquid will then overflow from the collecting region only when a filling state is reached which is higher than the overflow edge.

Preferably, the overflow edge is spaced apart from the at least one filter element. Arranged "spaced apart from the filter element" is denoted as an overflow edge which is either offset downwardly relative to the lower edge of the filter element or which is offset horizontally relative to the filter element and preferably relative to the filter body. In the last case, the overflow edge may be provided, for example, in the outer wall of a filter holder, against which the filter body is held on an inner wall. Since the overflow edge is spaced apart from the filter element, the entry of liquids which overflow from the collecting region over the overflow edge back into the filter element may be prevented.

The overflow edge of the collecting region is preferably formed by at least one overflow opening. These overflow openings may be incorporated, for example, in the outer wall of a trough-shaped filter holder, against which the filter body is held on an inner wall. The design of the overflow edge by the provision of openings has the advantage that a connection is also present between the collecting region and a part which is located above the overflow edge, for example the upper part of a filter holder with the fastening device, and thus the collecting region together with the filter holder may be fastened to a recess of a cooktop and removed therefrom.

The filter unit preferably has a cover which at least covers the at least one filter body at the top. The cover is constituted by, for example, a planar plate and therefore may also be denoted as a cover plate. The cover consists of a material which is impermeable both to liquids and air. Thus the cover may, for example, be a metal plate or plastics plate. The cover covers at least the filter body at the top. This means that the entry of air and/or entry of liquid into the upper face of the filter body is prevented. Such a cover is advantageous, in particular, in embodiments of the filter body in which said filter body forms a hollow body and the filter element(s) are provided in the envelope surface or outer surface of the filter body and the envelope surface or outer surface preferably extends vertically. In such a filter body, therefore, an opening is formed in the upper face, said opening being surrounded by the envelope surface or outer surface of the filter body. Without a cover, liquids and air might enter this opening and thus the air might not be cleaned by the filter elements and the liquids could penetrate the interior of a blower located below the filter unit and damage said blower. This may be prevented by the provision of a cover. According to a preferred embodiment, the size of the cover is larger than the surface of the upper face of the filter body. As a result, the cover protrudes on at least one side over the edge of the upper face of the filter body. As a result, for example, a filter element which is arranged in the filter body, such that said filter element is arranged inclined outwardly from the upper face of the filter body, may be protected from the direct entry of contaminants and, in particular, droplets of liquid from above.

The cover is preferably located on the filter body. The cover in this case may be fixedly connected to the filter body or releasably connected to the filter body.

According to one embodiment, the filter unit comprises a positioning element for positioning the lower edge of the at least one filter element. The positioning element is configured either as a part of the filter body or is configured on the filter holder. The "positioning element" is denoted as an edge or a projection onto which the lower face of the filter element may be positioned and preferably held. The positioning element is preferably provided on the outer face of the collecting region. The "outer face of the collecting region" in this case is denoted as the side which is remote from the interior of the collecting region in which liquids are received. Particularly preferably, the positioning element is provided on the side of a collecting region at which this collecting region faces the filter body. By this arrangement of the positioning element, the entry of liquids from the collecting region into the filter element may be reliably prevented.

The filter element according to the invention may be used for different fume extraction devices. In particular, however, the filter unit is used for fume extraction devices in which air is suctioned from above into an air inlet opening. The blower, therefore, is preferably arranged offset downwardly relative to the filter unit. Thus the filter unit may be used, for example, in known downdraft ventilation systems.

According to a further aspect, however, the object is achieved by a combination appliance having a cooktop and a fume extraction device arranged below the cooktop. The combination appliance is characterized in that it has at least one filter unit according to the invention.

Advantages and features which have been described relative to the filter unit apply—if practicable—correspondingly to the combination appliance and vice versa and where appropriate are only described once.

The combination appliance according to the invention comprises a cooktop and a fume extraction device. In particular, these two components of the combination appliance are designed as an assembly unit, i.e. a structural unit. This means that the two components of the combination appliance are fastened together indirectly or directly and may be installed as an assembly unit, for example in a work surface. The combination appliance thus constitutes an assembled or premounted unit or a premountable unit.

According to the invention, the cooktop comprises at least one heating element and preferably a cover plate. The cover plate covers the at least one heating element from above. The heating element may be constituted, for example, by an induction module.

According to the invention, the fume extraction device comprises a blower and preferably additionally an air duct for conducting the air out of the combination appliance after it has exited the blower.

According to the invention, the fume extraction device is arranged below the cooktop and, in particular, below the lower face of the cooktop. If the upper face of the cooktop is formed by a cover plate, as preferred according to the invention, the fume extraction device is therefore arranged below the cover plate. The blower of the fume extraction device may be arranged, for example, between two heating elements of the cooktop or may be located entirely offset downwardly relative to the heating elements.

Directional information, such as "above" and "below", which is cited in connection with the combination appliance or parts thereof, refers to the combination appliance in the assembled and installed state, i.e. in the state in which this combination appliance is incorporated, for example, in a horizontal work surface.

Since at least one filter unit according to the invention is used in the combination appliance according to the invention, a series of advantages may be achieved. In particular, by the arrangement according to the invention of the collecting region in the filter unit, liquids may be prevented from entering into the blower of a fume extraction device located below the cooktop. Additionally, a reliable cleaning of the suctioned air may be ensured, since the filter body of the filter element is arranged such that said filter body extends between the air inlet opening and the air outlet opening. The filter surface which is provided by the filter element(s), which is or are provided in the filter body, may be maximized thereby.

According to one embodiment, the combination appliance comprises a cooktop having at least one recess for extracting air from the space above the cooktop via the at least one recess, and the filter unit is incorporated from above in at least one of the recesses.

According to the invention, at least one recess is provided in the cooktop. The recess may preferably be incorporated in the cover plate of the cooktop.

Since according to the invention at least one recess is provided in the cooktop and a filter unit is incorporated therein, a series of advantages may be achieved. Firstly, the recess(es) may be incorporated in the cooktop such that said recess(es) may be located in the vicinity of the heating elements of the cooktop and, as a result, in the vicinity of the point of origin of the fumes and vapors which are designed to be extracted by the fume extraction device. Additionally, in the combination appliance the blower may be provided directly below the recess and thus the extraction of air from the space above the cooktop may be further improved. In particular, the filter unit according to the invention is advantageous in such an arrangement of the blower. By means of the collecting region which is provided on the filter unit, such that said collecting region at least partially surrounds the filter body and is located below the air inlet opening of the filter unit, liquids which enter inadvertently, such as boiled over food, are reliably received in the filter unit and the blower of the fume extraction device is thereby protected. Finally, since the filter unit is incorporated from above into the recess of the cooktop, the filter unit may be removed in a simple manner, for example for cleaning purposes.

According to a preferred embodiment, the combination appliance comprises an overflow container which surrounds at least a part of the collecting region. "Surrounding the collecting region" denotes an overflow container which is arranged at least partially below the collecting region and which, in a vertical projection of the collecting region on the overflow container, protrudes at least partially over at least one lateral edge of the collecting region. Preferably, the overflow container is constituted by a trough, a through-opening being provided in the bottom thereof and being surrounded by a protective wall. The overflow container is thus preferably formed in the lower region by at least one groove. The groove may be constituted by a peripheral groove. In a filter body which is surrounded on only two sides by a collection container, however, the overflow container may also be designed with only two grooves.

Preferably, the overflow container surrounds at least the part of the collecting region on which an overflow edge is formed. As a result, a reliable supply of liquids to the overflow container may be ensured, said liquids overflowing from the collecting region over the overflow edge.

The overflow container is preferably constituted by a component designed separately from the filter unit and is fixedly connected to the combination appliance. The overflow container may be positioned, for example, onto the blower housing of the blower of the fume extraction device. Alternatively, however, it is also possible for the overflow container to be provided on the cooktop, for example the lower face of the cooktop, and optionally fastened there. The overflow container is preferably arranged in the combination appliance such that said overflow container is arranged above the blower of the fume extraction device or at least partially surrounds said blower. The filter unit is releasably connected to the combination appliance and may be incorporated, for example, in a recess of the cooktop and releasably held there. However, it is also within the scope of the invention that the filter unit is incorporated in the overflow container via the recess, and bears against a part of the overflow container, for example the upper edge of a protective wall surrounding a through-opening, and thus is held thereon. Since the overflow container is constituted by a separate component which may be incorporated in the combination appliance, the size and position thereof may be selected such that it is possible to ensure that the blower of the fume extraction device is more reliably protected against the entry of liquids. In a blower attached to the bottom of an appliance housing of the combination appliance, the use of the bottom as an overflow container would lead to an entry of the liquids collected therein into the blower and thus damage said blower.

According to one embodiment, in each case the collecting region and the overflow container are groove-shaped. In this case the collecting region may be formed by the groove shape, while the groove shape on the overflow container is configured, for example, only in the lower region of the overflow container. The width of the groove of the overflow container in this case is preferably larger than the width of the groove of the collecting region. As a result, the supply of liquids from the collecting region to the overflow container may be ensured.

BRIEF DESCRIPTION OF THE DRAWINGS

The invention is described in more detail once again hereinafter with reference to the accompanying figures, in which.

DETAILED DESCRIPTION OF EXEMPLARY EMBODIMENTS OF THE PRESENT INVENTION

Figure 1:
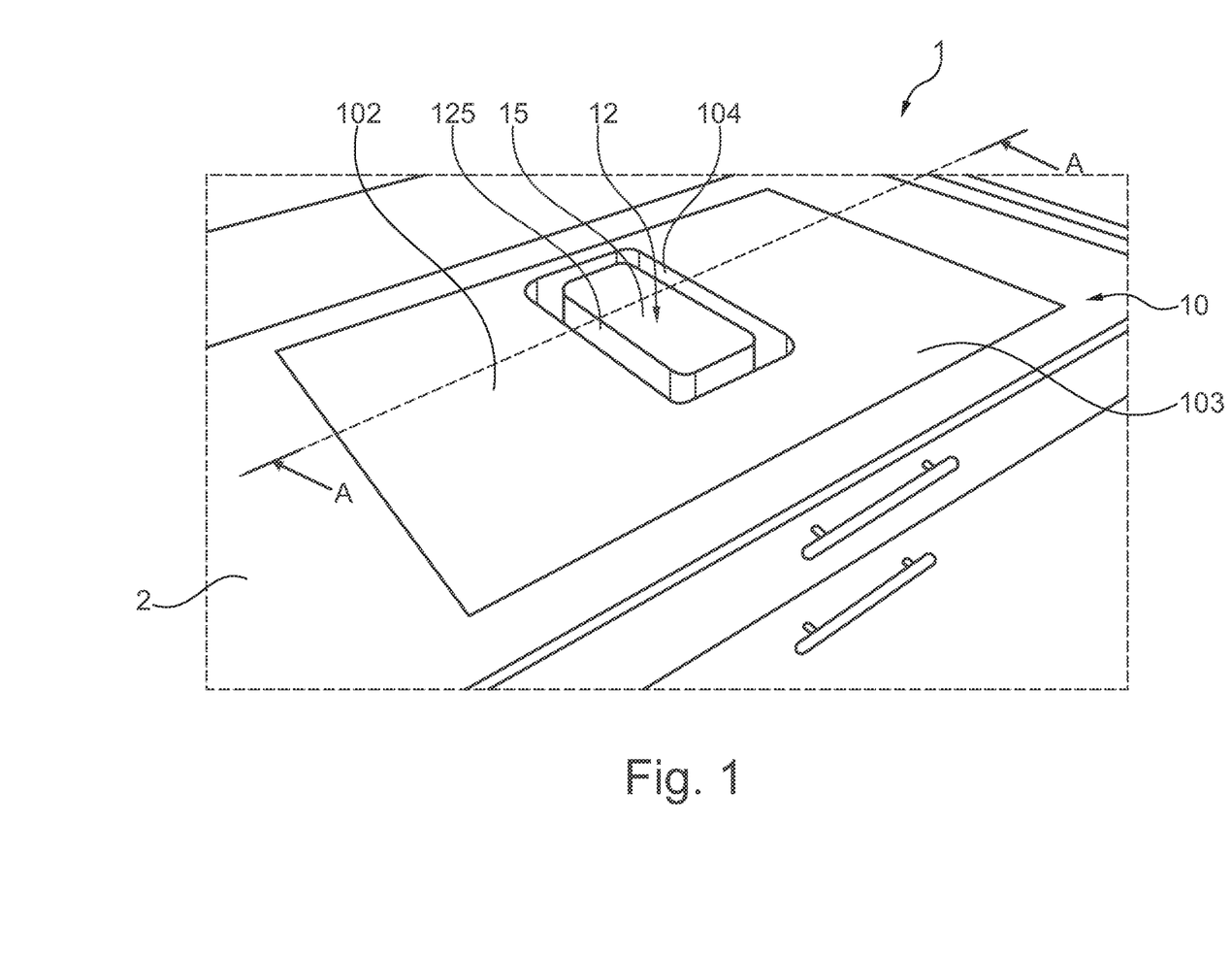
FIG. 1 shows a schematic perspective plan view of an embodiment of the combination appliance according to the invention.

An embodiment of a combination appliance 1 according to the invention is shown in FIG. 1. The combination appliance 1 comprises a cooktop 10 and a fume extraction device, not visible in FIG. 1. The combination appliance 1 is incorporated in a work surface 2. The cooktop 10 is arranged in the upper region of the combination appliance 1. In the embodiment shown, the cooktop 10 comprises a cover plate 103. Heating elements (see FIG. 2) are arranged below the cover plate 103. The region of the cover plate 103 in which a heating element 101 is arranged below the cover plate 103, i.e. on which food to be cooked may be heated, is also denoted as the cooking zone 102 or cooking point.

As visible from FIG. 1, a recess 104 is incorporated in the middle of the surface of the cooktop 10 and, in particular, in the cover plate 103. The recess 104 has a quadrangular cross section and extends over the middle of the surface of the cover plate 103. In the embodiment shown, the recess 104 extends in the depth direction of the combination appliance 1.

A cover 15 which covers a part of the recess 104 is provided in the recess 104. The length and width of the cover 15 are in this embodiment smaller than the length and width of the recess 104. The "length" of the recess 104 and the cover 15, denotes the surface direction which is located in the depth direction of the combination appliance 1, i.e. in the direction between the front face and the rear face of the combination appliance 1. The cover 15 in the first embodiment is located in the plane of the cover plate 103. The cover 15 forms the upper face of a filter body (see FIG. 2) of a filter unit incorporated in the recess 104 (see FIG. 2). Therefore, in the embodiment shown, a peripheral gap is formed between the recess 104 and the cover 15, said gap forming the air inlet opening 125 of the filter unit 12.

A blower of the fume extraction device of the combination appliance is arranged below the recess 104, not visible in FIG. 1. Via the air inlet opening 125 air is suctioned by the fume extraction device into the combination appliance. The air inlet opening 125 of the filter unit 12 thus also forms the suction opening of the combination appliance 1.

Figure 2:
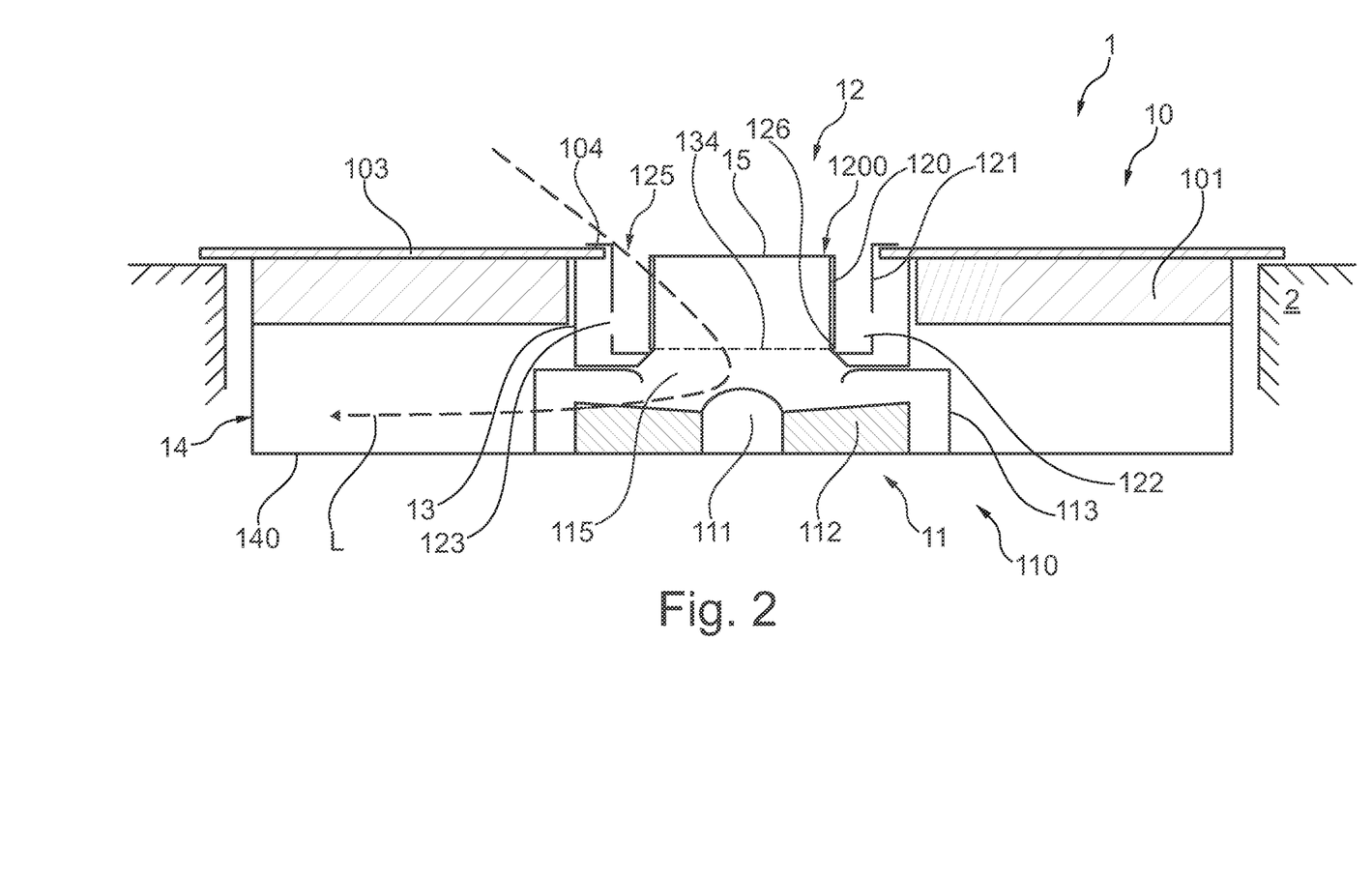
FIG. 2 shows a schematic sectional view of the embodiment of the combination appliance according to the invention along the cutting line A-A in FIG. 1.

In FIG. 2, the embodiment of the combination appliance 1 according to the invention according to FIG. 1 is shown schematically in sectional view. In this case, only the parts of the combination appliance 1 located in the cutting plane are shown in order to improve the clarity thereof. The combination appliance 1 is incorporated in an opening of a work surface 2. The blower 110 of the fume extraction device 11 which is arranged below the recess 104 in the cooktop 10, in particular the cover plate 103, is shown in FIG. 2. Additionally, the filter unit 12 which is arranged between the recess 104 and the blower 110 is visible in FIG. 2. The blower 110 comprises a motor 111 which drives a fan wheel 112. The fan wheel 112 and the motor 111 are received in a blower housing 113. The blower housing 113 has an air inlet opening 115 on the upwardly facing side, i.e. the side facing the cooktop 10. The blower 110 is constituted by a radial fan in which the air suctioned axially into the blower housing 113 via the air inlet opening 115 is discharged again via an air outlet opening (not shown) on the blower housing 113 in the radial direction. The air inlet opening 115 of the fan housing 113 is aligned with the recess 104 in the cover plate 103 such that the air inlet opening 115, in a vertical projection of the recess 104 on the air inlet opening 115, is entirely located within the surface of the recess 104.

In spite of this alignment of the air inlet opening 115, in the mounted state of the combination appliance 1 this air inlet opening is not visible to the user. The filter unit 12 according to the invention is thus arranged above the blower housing 113.

Figure 3:
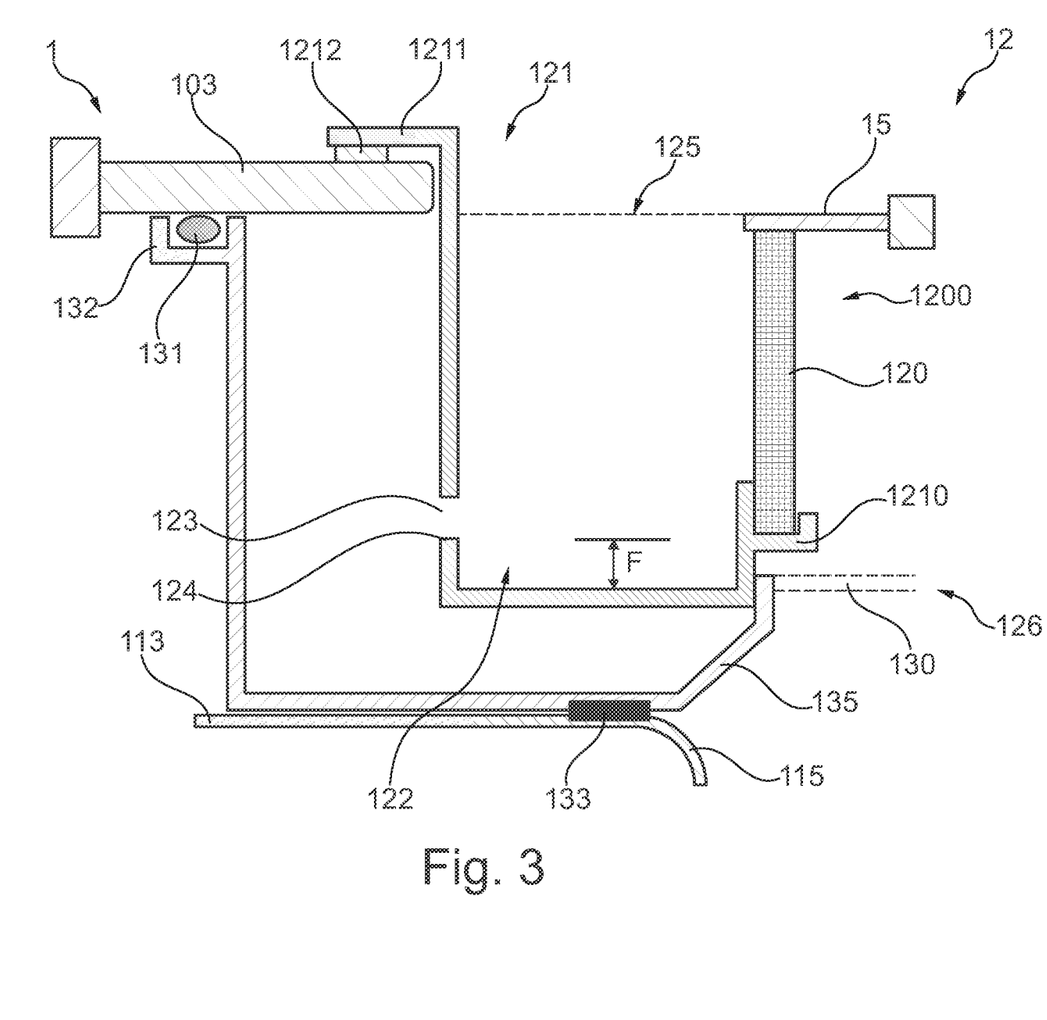
FIG. 3 shows a schematic sectional view of a part of the embodiment of the filter unit according to the invention of FIG. 2.

The filter unit 12, which is also shown in more detail in FIG. 3, comprises in the embodiment shown a filter holder 121 and a filter body 1200. The filter body 1200 may be designed with the filter holder 121 as a sub-assembly. In any case, however, the filter body 1200 and the filter holder 121 are connected together. Additionally, the combination appliance 1 comprises an overflow container 13.

In the embodiment shown, the filter body 1200 is constituted by a hollow body. At least one filter element 120 is held in the filter body 1200. The filter surfaces of the filter element 120 extend vertically. In the embodiment shown, the filter body 1200 is held on a filter holder 121 which has an annular trough shape. The outer walls of the filter holder 121 are fastened on their upper face to the cover plate 103. For example, the filter holder 121 is able to bear against the cover plate 103 via bent-back portions 1211 on the edge of the recess 104 which are oriented outwardly and provided on the upper edge of the outer walls. The outer walls of the filter holder 121 have a height which is greater than the height of the filter body 1200. Thus a collecting region 122 is formed in the lower region of the filter holder 121, said collecting region being located below the filter element 120. In particular, the collecting region 122 is formed by the connection of the outer wall of the filter holder 121 and the inner wall of the filter holder 121 on which the filter body 1200 is held, and comprises the bottom of the annular trough of the filter holder 121.

A cover 15 is applied to the upper face of the filter body 1200. This cover may be positioned onto the filter element 120 or at least partially incorporated in the filter element 120 of hollow design.

The collecting region 122 of the filter holder 121, in a vertical plan view of the cooktop 10, covers the gap, i.e. the air inlet opening 125 of the filter unit 12 between the cover 15 and the recess 104, i.e. is located below the air inlet opening 125.

According to the invention, the filter holder 121 may also be designed in one piece with the filter body 1200. In particular, the outer walls of the filter holder 121, on which preferably bent-back portions 1211 are provided for fastening to the cooktop 10, the collecting region 122, which constitutes the bottom of the filter holder 121, and a frame, in which the filter element(s) 120 are received, are configured as one part. In this case the filter elements 120 may be held on the frame, for example by the shoulder elements 1210 shown in FIG. 3, i.e. applied thereon or pushed therein. In this case, the frame and the filter elements 120 form the filter body 1200. However, it is also possible for the filter body 1200 to be designed separately from the filter holder 121. In this case, the filter body 1200, for example, may be inserted into the preferably trough-shaped filter holder 121. Also in this embodiment the filter holder 1200 may comprise a frame, for example with shoulder elements 1210 for the filter element 120. According to a further embodiment, however, it is also possible that the filter body 1200 is formed exclusively from the filter element(s) 120. In this case, the filter elements 120 are shaped or arranged such that said filter elements form a hollow body which is open at the top and at the bottom and, for example, has a round or rectangular cross section. Also, in this embodiment a cover 15 is preferably positioned on the filter element 120.

In the embodiment shown in more detail in FIG. 3, the filter body 1200 is formed by the filter element 120. The filter body 1200 and/or the filter element 120 is held on the filter holder 121. To this end, a shoulder element 1210 is provided on the outer face of the inner wall of the filter holder 121 which surrounds the air outlet opening 126 of the filter unit 12, said shoulder element extending into the air outlet opening 126. The filter element 120 is positioned on this shoulder element 1210 and is held thereon by a projection on the free end of the shoulder element 1210. On the outer wall of the filter holder 121 a bent-back portion 1211 is provided on the upper edge, said bent-back portion being oriented outwardly and being able to serve for mounting the filter unit 12 on the recess 104 of the cooktop 10. One or more overflow openings 123 are incorporated in the lower region of the outer wall of the filter holder 121. The lower edge of the overflow opening 123 forms the overflow edge 124 via which liquids are able to reach the overflow container 13. The overflow openings 123 are incorporated at a height which is level with the upper edge of the inner wall of the filter holder 121 or is offset downwardly thereto. As a result, it is ensured that the height at which the overflow openings 123 are incorporated above the bottom of the filter holder 121 defines the maximum filling level height F of the collecting region 122.

An overflow container 13 is provided between the filter holder 121 and the blower housing 113 in the embodiment shown. The overflow container 13 also has an annular trough shape. The overflow container 13 has a larger width than the filter holder 121. The filter holder 121 is received in the overflow container 13, at least in the lower region thereof in which the collecting region 122 is formed. The overflow container 13 is arranged at a lower level in the combination appliance 1 than the filter holder 121. As a result, a spacing is present between the bottom of the overflow container 13 and the collecting region 122 of the filter holder 121. At least this spacing serves for receiving liquids.

The filter unit 12 is releasably fastened to the combination appliance 1. For example, the filter unit 12 may be introduced into the recess 104 and mounted there. The overflow container 13 may be releasably connected to the combination appliance 1. Thus the overflow container 13, for example, may be loosely positioned on the blower housing 113 or mounted in the recess. The central through-opening 134, which is produced by the annular shape of the overflow container 13, in this case is aligned with the air inlet opening 115 of the blower housing 113. The through-opening 134 is surrounded by an upwardly extending protective wall 135. A protective grille 130 may be provided in the through-opening 134 of the overflow container 13. However, it is also possible and preferred to connect the overflow container 13 fixedly, for example to the cover plate 103 or the blower housing 113.

A seal, for example a sealing ring 1212, may be provided between the filter unit 12 and the cooktop. This sealing ring may be placed around the recess 104 and, for example, the bent-back portion 1211 of the filter holder 121 may be positioned onto this sealing ring 1212. Moreover, seals 131 and 133 are also shown in FIG. 3, the overflow container 13 being sealed thereby relative to the other elements of the combination appliance 1. By means of the seal 131, which may be constituted by a sealing ring received on the upper edge of the overflow container 13, in particular in a sealing slot 132, the overflow container 13 is sealed against the cover plate 103 of the cooktop 10. By means of the seal 133 which is provided on the lower face of the overflow container 13, the lower face of the overflow container 13 is sealed against the blower housing 113. By the provision of seals, firstly an uncontrolled entry of liquids into the combination appliance 1 may be prevented and secondly the guidance of air from the air inlet opening 125 to the blower 110 may be ensured.

The annular trough shape, which the filter holder 121 and the overflow container 13 preferably comprise, is understood both as a round shape and a quadrangular shape in plan view. The shape of the filter holder 121 and the overflow container 13 are selected according to the shape of the recess 104.

In the embodiment according to FIG. 2, an appliance housing 14 of the combination appliance 1 is also provided in which the fume extraction device 11 and the cooktop 10 are received. In the embodiment shown, the heating elements 101 of the cooktop 10 are received in the appliance housing 14 and the appliance housing 14 is covered from above by the cover plate 103. The fume extraction device 11 is additionally provided in the appliance housing 14. Of the fume extraction device 11, only the blower 110 may be seen in FIG. 2. The blower 110 is fastened to the bottom of the appliance 140 of the appliance housing 14.

As an alternative to the embodiment shown, in which the cooktop 10 and the fume extraction device 11 are received in an appliance housing 14, according to the invention it is also possible and preferable to design the combination appliance 1 without the appliance housing 14. In such an embodiment, for example the upper face of the blower 110, for example the side in which the air inlet opening 115 is provided, may be fastened in the region which is located outside the air inlet opening 115 to the lower face of the cooktop, in particular a cooktop housing (not shown).

Figure 4:
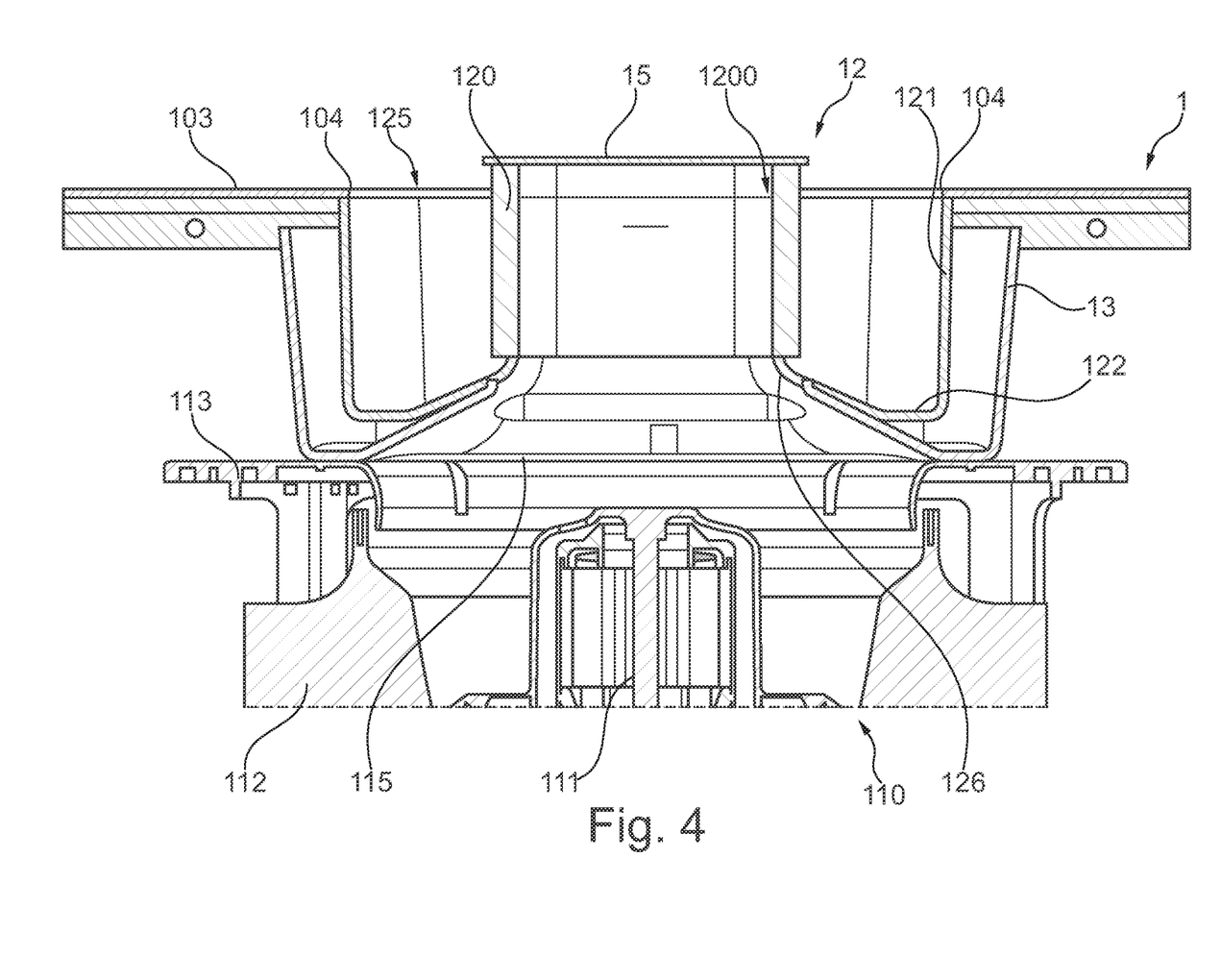
FIG. 4 shows a schematic sectional view of a second embodiment of the filter unit according to the invention.

In the embodiment shown in FIG. 4, in contrast to the first embodiment according to FIGS. 1 to 3, the cover 15 is provided at a height which is located above the plane of the upper face of the cooktop 10, in particular the cover plate 103. Additionally, in this embodiment the inner walls of the filter holder 121 are configured as inclined surfaces. Moreover, the filter element is positioned on the inner wall of the filter holder.

The function of the combination appliance 1 and the filter unit 12 is now described once again.

In the blower 110 the fan wheel 112 is driven by a motor 111. As a result, air is suctioned into the blower housing 113 via the air inlet opening 115 of the blower housing 113 which faces upwardly and thus toward the cooktop 10. The air in this case is suctioned from above the cooktop 10 through the recess 104 into the combination appliance 1. In particular, the air enters through the air inlet opening 125 of the filter unit 12 between the edge of the recess 104 and the cover 15 into the combination appliance 1 and is suctioned toward the air inlet opening 115 of the blower 110. In this case, the suctioned airflow L passes through the filter element 120 from outside to inside. The air thus cleaned is blown out via an air outlet opening (not shown) of the blower housing 113 and from there, either indirectly via an outlet channel (not shown) or directly, reaches an air outlet (not shown) of the appliance housing 14. From there, the air may be discharged into the surroundings or into the space in which the combination appliance 1 is operated.

Liquids such as water and fat, which are separated on the filter element 120 from the air, are able to pass down in the filter element 120. Since the filter body 1200 is held by the at least one filter element 120 on a filter holder 121, which has a collecting region 122 below the filter body 1200, the liquid may be collected there and does not reach the blower 110. If either a large quantity of liquid is separated at the filter element 120 or liquid enters the combination appliance 1 in large quantities via the air inlet opening 125, for example when food overboils, the collecting region 122 of the filter unit 12 initially fills up. Overflow openings 123 are incorporated in the filter unit 12, in particular in the outer wall of the filter holder 121. Via these overflow openings, the liquid runs into the overflow container 13 provided around the filter unit 12.

While the invention has been described substantially with reference to vertically extending filter elements 120, it goes without saying that other filter elements 120, such as for example horizontally or inclined filter elements, may also be used.

A solution is provided by the present invention in which the blower of the fume extraction device may be arranged directly below the recess in the cooktop. Preferably, the recess is of rectangular design and has a longitudinal extent in the depth direction of the cooktop. As a result, the recess and thus the suctioning area run along the cooking zones of the cooktop.

The filter unit having the filter element, which may also be denoted as fat filter, is preferably removable from the combination appliance.

Preferably, a collecting region for liquids, which may also be denoted as the liquid container, is provided. Fat or water, which pass through the gap between the cover and the recess, may be trapped and collected in this collecting region. The liquid container is preferably able to be removed from the combination appliance.

In the event of too large a quantity of liquid entering through the gap, at least one overflow opening, which may also be denoted as an overflow hole, is preferably provided on the collecting region so that this liquid may flow into an overflow container. The overflow container is preferably fixedly mounted in the combination appliance and therefore also denoted as a fixed container. The fixed container is preferably not dismantlable but may be cleaned by hand or emptied from below via an opening.

The filter element, the collecting region and the cover may be a single unit. Alternatively, however, it is also possible that only the cover and the collecting region form a unit.

The present invention has a series of advantages. In particular, by means of the filter unit according to the invention, due to the optional positioning of the blower below the recess and the alignment of the air inlet opening upwardly, potentially only one blower is required. This blower may be larger and rotate more slowly and thus generate less noise. Additionally, the blower may be protected by the filter unit and optionally an overflow container.

The invention claimed is:

1. A combination appliance, comprising:
   a cooktop,
   a fume extraction device arranged below the cooktop, and
   a filter unit comprising a filter body having a filter element and a collecting region which is situated below the filter body and at least partially surrounds the filter body for collecting a liquid, an upper region formed with an air inlet opening to let in air that is suctioned by the fume extraction device, said air inlet opening at least partially surrounding the filter body, and a bottom side provided with an air outlet opening to let air out of the filter unit to the fume extraction device, wherein the filter body forms a hollow body which is open at least at the bottom side, said air outlet opening of the filter unit being formed in a lower face of the hollow body and wherein the collecting region has an upper edge which at least in part forms an overflow edge for overflow of liquid, said overflow edge being disposed in spaced-apart relation to the filter element.

2. The combination appliance of claim 1, wherein the filter element is located in the filter unit in a direction which is inclined relative to a horizontal.

3. The combination appliance of claim 1, wherein the filter element is located in the filter unit in a vertical direction.

4. The combination appliance of claim 1, wherein the filter body has a round or quadrangular cross section.

5. The combination appliance of claim 1, wherein the filter unit includes a filter holder configured to hold the filter body and to at least partially surround the filter body, said collecting region constituting a bottom of the filter holder, said filter body being received in the filter holder.

6. The combination appliance of claim 1, wherein the filter unit includes a cover configured to at least cover a top of the filter body.

7. The combination appliance of claim 6, wherein the cover bears against the filter body.

8. The combination appliance of claim 1, wherein the cooktop has a recess for extracting air from a space above the cooktop via the recess, said filter unit being incorporated from above in the recess.

9. The combination appliance of claim 1, wherein the filter unit is releasably connected to the combination appliance.

* * * * *